United States Patent Office 3,056,397
Patented Oct. 2, 1962

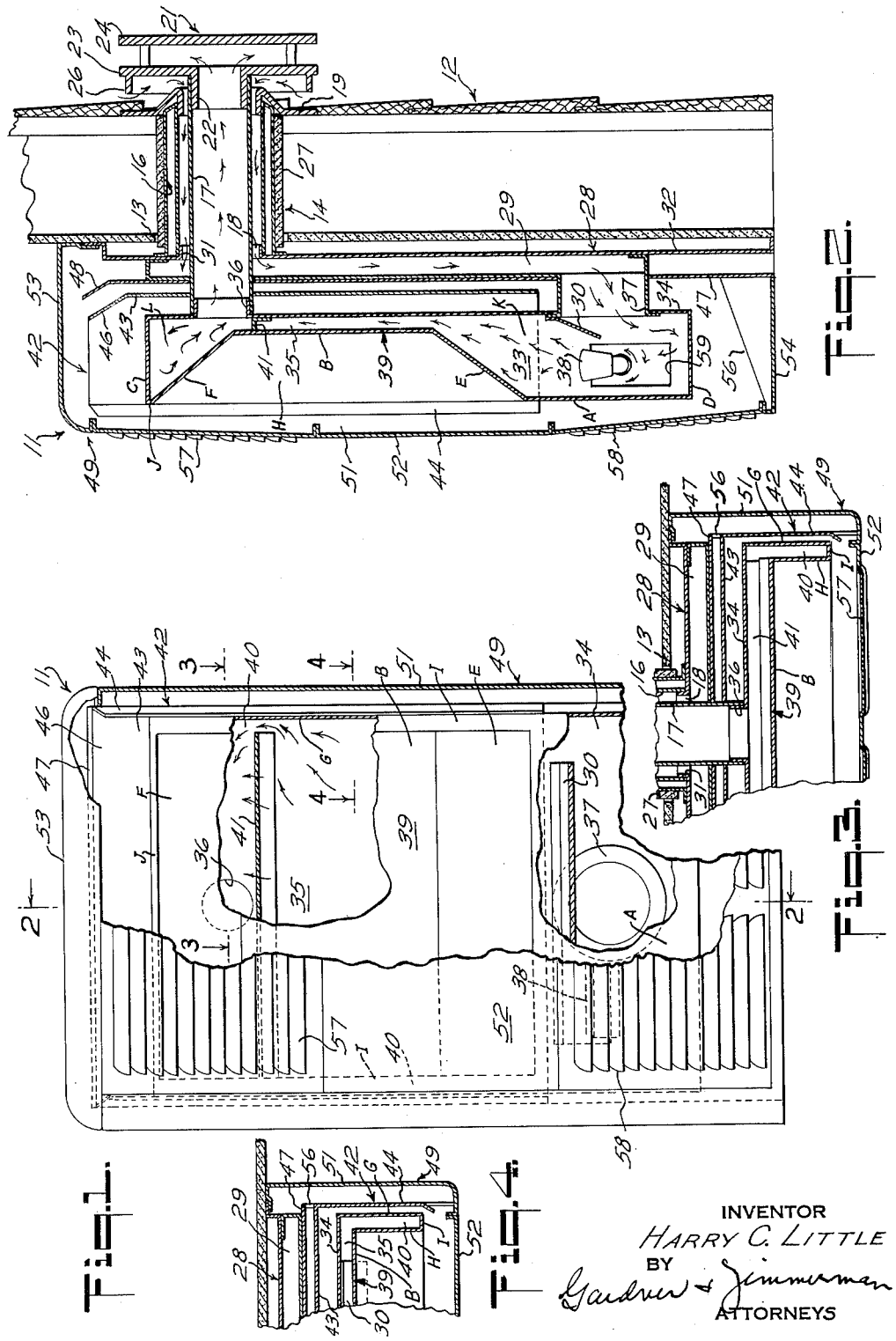

3,056,397
WALL HEATER
Harry C. Little, San Rafael, Calif., assignor to H. C. Little Burner Company, Inc., San Rafael, Calif., a corporation of California
Filed Feb. 27, 1957, Ser. No. 642,711
2 Claims. (Cl. 126—85)

The present invention relates to an improved safety vent wall heater adapted for mounting against an exterior wall of a building and providing air inlet and combustion gas outlet through a single wall opening.

The wall heater of this invention includes a double duct single unit air flow element adapted for disposition through a building wall and providing air inlet passage to a heater combustion chamber and a gas outlet therefrom. There is thus provided a completely closed system communicating only with the outside of the building and requiring but a single wall aperture. Room heating is accomplished by conduction from the combustion chamber wall to room air in contact therewith and in common with other types of heaters room air circulation results from the rising of heated air from the heater to set up air currents whereby convection heating of the room results.

In order to maximize heater efficiency it is necessary to transfer as much heat as possible from hot gases produced in the heater, by combustion of such as natural or manfuactured gases, to the combustion chamber walls in order to provide a maximum amount of heat to these walls for transfer to room air passing thereover. To this end the combustion chamber is herein compressed or reduced in cross section over a substantial portion thereof whereby combustion gas flow over the chamber walls is maximized to enhance heat transfer therebetween. Additionally, there is provided in the present invention a combustion gas baffle materially constricting the gas flow passage from the combustion chamber for further enhancing heat transfer by slowing down combustion gas traverse of the combustion chamber walls, and by producing gas turbulence beyond the baffle and yet within the chamber or an extension thereof bounded by heat transfer walls contacting room air to provide an even greater heat transfer to these walls.

In the type of heater herein contemplated a closed air flow path is provided from the outside of a building or the like through a combustion chamber and back outside so that no combustion gas may enter the room being heated and the flow of air or gas through this closed system is accomplished by convection currents. Rather than employ expensive and bulky forced draft means such as air pumps or the like the convection principle is employed wherein rising heated gas produces the driving force for circulation through the heater system. In order for maximum effect to be realized from convection it is necessary that any passage wherein air travels downward remain cool in order that air therein not be heated to reverse the direction of air flow. In the present heater wherein a single intake and exhaust element or unit is employed difficulties arise in this connection for intake air must flow downward to the bottom of a combustion chamber that necessarily exhausts from the top and with enhanced heat transfer from the combustion chamber as above noted the intake air passages tend to become heated as they necessarily parallel the combustion chamber at least in part and are preferably located adjacent thereto for minimizing overall heater size. This invention overcomes the aforementioned problem by the provision of a multiple wall structure between combustion chamber and air inlet passage providing for heat reflection and also heat conduction away from the inlet passage for removal by passing room air that serves further to add to the heat output of the heater while simultaneously protecting the air passage.

It is an object of the present invention to provide an improved wall heater having a combustion chamber with means therein causing turbulence of combustion gas for maximized heat transfer to the chamber walls.

It is another object of the present invention to provide a closed system air heater employing convection flow therein with closely spaced air inlet passage and combustion chamber and having means for restraining heat flow from combustion chamber to air inlet passage.

It is a further object of the present invention to provide a wall heater having a single unit air inlet and outlet terminating a convection flow closed system wherein a maximum heat transfer combustion chamber is separated from air inlet passages by means transferring heat to surrounding air for maximum heater efficiency.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawing, wherein:

FIGURE 1 is a front elevational view of the wall heater with portions broken away as indicated.

FIGURE 2 is a vertical center section of the heater taken at 2—2 of FIGURE 1.

FIGURE 3 is a fragmentary horizontal sectional view taken on the line 3—3 of FIGURE 1.

FIGURE 4 is a view similar to FIGURE 3, but taken on the line 4—4 of FIGURE 1.

Considering now the structural details of the present invention as illustrated in the drawings and referring thereto, the wall heater 11 will be seen to be adapted for mounting upon an exterior wall 12 of a building. A single opening 13 is formed in the wall 12 and there is disposed therethrough a duct or vent unit 14 including a double-walled cylinder 16 having an air space between the inner and outer walls thereof. Within the cylinder 16 there is provided a vent pipe 17 having longitudinal fins 18 slidably engaging the interior wall of the cylinder 16 to fix the pipe centrally through the cylinder. On the exterior surface of the wall an annular vent flashing 19 is disposed over the cylinder end and upon the wall 12 and a vent cap 21 is located over the exterior of the vent unit 14 by means of a stub cylinder 22 fitting within the vent pipe 17. The vent cap includes a pair of plates 23 and 24 spaced apart by risers that may be formed integral therewith and the stub cylinder 22 extends through an opening in the inner plate 23. There will thus be seen to be provided a vent path through the vent pipe 17 out between the vent cap plates 23 and 24 and an air inlet path between the vent pipe 17 and cylinder 16 from behind the inner plate of the vent cap 21. The vent pipe thus extends beyond the cylinder 16 and outside of the wall 12 so that the inner vent cap plate 23 is spaced from the wall and an annular flange 26 is formed about the inner surface of this plate adjacent the outer edge thereof to separate the air inlet as much as possible from the vent outlet between the cap plates. As one further element of the vent unit 14 there may be provided a layer of insulation 27 about the cylinder 16 through the wall opening as an added safety measure.

The heater interior of the wall 12 includes a vertical flat rectangular air duct 28 defining an air passage 29 having a stub cylinder 31 communicating therewith and sliding into the cylinder 16, so that air entering through the annular vent unit passage travels into the duct 28. A back wall 32 of the duct 28 extends beyond the duct down to the bottom of the heater for engagement with a room floor and has a flanged end adapted to contact the wall 12 for positioning the heater therefrom while the top of the duct wall 32 is likewise flanged to engage the room wall. The outer wall of the vent unit cylinder 16 is attached to the back duct wall 32 and the vent pipe 17 extends entirely through the duct in sealing relation to the front thereof.

In front of the air duct 28 there is disposed a combustion chamber 33 defined by a generally rectangular enclosure having a planar back wall 34 spaced from and parallel to the front of the air duct 28. The chamber wall 34 has a stub cylinder 36 extending rearwardly therefrom near the top thereof into the vent pipe 17 in sealing relation thereto and is apertured near the bottom thereof to receive a large tube or pipe 37 secured thereto and to the air inlet duct 28 for communication therebetween. Within the combustion chamber 33 is provided a burner 38 operating to burn a fluent supplied thereto by piping not shown and operated by conventional control means also not shown and forming no part of this invention. The combustion of such as natural or manufactured gas at the burner 38 is supported by air flowing into the combustion chamber 33 through the tube 37 at the burner level and the hot combustion gases thereby produced naturally rise by convection through the combustion chamber for exhaust through the vent pipe 17. An air duct baffle 30 disposed across the inlet pipe 37 controls air flow as noted below.

Heat is supplied from the heater through the combustion chamber walls so that maximum heat transfer from the hot combustion gases to the walls is desired. To this end the combustion chamber is formed with a centrally recessed front wall 39 spaced closely from the back wall 34 but extending laterally short of the side walls to define a wide flat central passage 35 and a pair of deep narrow vertical side passages 40, one along each side of the chamber housing. Between the expanded upper and lower portions of the combustion chamber 33 there are thus defined a pair of deep narrow side passages 40 and a wide flat central passage 35, all of limited cross section and through which combustion gases flow from the burner toward the vent pipe 17. The recessed front wall construction can be seen best from FIGS. 2 and 4. As shown best in FIG. 2, the front wall 39 has a vertically extending lower portion A which is planar and is disposed generally parallel to the back wall 34. The recessed portion of the front wall includes a planar and vertically extending bottom portion B which is quite closely spaced and generally parallel to the back wall 34. The top wall C and the bottom wall D are of similar depth, the lower wall portion A extending upwardly from the bottom wall D to a line of intersection with an upwardly and inwardly sloping wall portion E which extends therefrom to a line of intersection with the bottom portion B. Likewise, there is provided a downwardly and inwardly sloping wall portion F which extends from closely adjacent the top wall C to a line of intersection with the bottom portion B, all as is clearly shown in FIG. 2.

Extending between the top and bottom walls C and D are vertical side walls such as is best illustrated by the reference character G in FIGS. 1 and 4. The recessed portion of the front wall, as can be best seen in FIG. 4, is bounded on its opposite sides by the inner side wall portions H which extend from the front face rearwardly to lines of intersection with the bottom portion B. Thus, there are narrow vertical extensions I of the lower portion A, being coplanar therewith, and which extensions extend upwardly to the top of the chamber and there may be also provided a narrow strip J extending between the upper extremities of these extensions I and from which portion J the downwardly and inwardly sloping wall portion F originates.

Thus, the combustion chamber 33 has a lower expanded portion K bounded on its opposite sides by the lower portions of the side walls G, by the bottom wall D, in front by the lower wall portion A and on top by the inwardly and upwardly sloping wall portion E and, of course, by the back wall 34. The wide flat central passage 35 is bounded by the bottom portion B and the immediately opposed portion of the back wall 34.

The expanded upper portion L of the combustion chamber is bounded by the upper extremity of the back wall 34, by the upper extremities of the side walls G, by the top wall C and by the downwardly and inwardly extending wall portion F, whereas the passages 40 are bounded primarily between the side walls G and inner side walls H. In other words, the combustion chamber 33 which extends vertically upwards from the expanded lower portion K to substantially the top wall C has a U-shaped cross sectional form including a flat central portion and angularly related flat side portions. More expressly, the flat central portion comprises central passage 35 and the coextensive region of expanded upper portion L which is defined at the front by sloping wall portion F, at the back by the upper portion of back wall 34, and at the sides by the upper portions of the wall G. Each of the flat side portions comprises the region of the chamber indicated as passage 40 and the coextensive region of expanded upper portion L defined at the front by the upper portions of the narrow vertical extension I, at the sides by the upper portion of side walls H and G, and at the back by the upper portion of back wall 34. As an additional improvement in the combustion chamber there is provided for the purpose of maximizing heat transfer to the chamber walls a gas baffle 41, in the form of an angle iron for example, disposed upon the back wall 34 directly below the vent pipe 17 and extending across the central flat passage 35 to the side passages 40. This gas baffle operates to prevent gas flow directly to the vent pipe and to force the combustion gas to circulate in the upper expanded portion of the combustion chamber prior to exhaust. The placement of the gas baffle immediately below the vent pipe 17 forces at least a good portion of the gas flowing up through the central passage to detour around the baffle so as to strike the upper chamber walls above the baffle. In this manner there is produced a turbulent gas flow in the upper part of the combustion chamber so that substantially all of the gas strikes the chamber walls to give up heat thereto and no laminar flow directly to the vent pipe is possible and maximized heat transfer results. Furthermore, the recessed portion serves to effectively direct the gas to the passages 40 and provide increased heat transfer surface.

With the foregoing construction of combustion chamber there is produced a high level of heat transfer to the chamber walls and thence to air passing over the outer surfaces thereof, however, this heat transfer occurs to all combustion chamber walls including the back wall and unless expensive and bulky insulation is employed thereat a large quantity of heat emanates from this wall. Such a situation is disadvantageous in more than one respect, with the more obvious being that the heat is not available to the room air so as to reduce heater efficiency. Of at least equal importance, however, is the undesirable effect such heat would have upon the heater itself for without preventative measures the heat liberated by the back wall of the combustion chamber would be absorbed by the air inlet duct 28 adjacent same so that the temperature of entering air passing therethrough would be raised. As convection air flow is employed in the heater of the present invention heating of the air flowing downward in the inlet air passage 29 of the duct 28 would tend to retard air flow and under extreme conditions reduce same sufficiently to cause incomplete combustion at the burner, for air heated in the air passage 29 would tend to rise back out the inlet passage of the vent unit 14. This is of particular importance here where a high efficiency combustion chamber is employed and further where the gas baffle 41 already tends to slow down the draft through the heater system.

The present invention operates to preclude the aforementioned difficulties by the provision of a plurality of walls intermediate the combustion chamber 33 and air inlet passage 29. There is provided about the combustion chamber a shield 42 including a back wall 43 disposed in spaced relation to the back wall of the combustion chamber and having a pair of side walls 44 extending along the sides of the combustion chamber in spaced relation thereto and an inclined upper plate 46 slanting over the combustion chamber. This shield 42 encompasses the combustion chamber at least above the burner 38 therein except for the front thereof and serves to reflect heat back to the combustion chamber wall and to conduct heat to air passing thereover. Although this heat shield is quite efficient in reducing heat transfer to the air passage 29 yet the shield does itself absorb heat and radiate toward the air duct 28. Heat passed by the shield 42 is prevented from reaching the air passage by means of a heat barrier wall 47 disposed in spaced relation to the heat shield 42. This heat barrier wall may be mounted directly upon the front of the box 28 and extends to the room floor to prevent air flow over the exterior of the air inlet duct 28 while additionally serving as a structural member of the heater. The top of the heat barrier wall is inclined toward the combustion chamber to form an upper lip 48 that serves not only as a means for radiating heat from the baffle but also as a further deterrent to air flow over the exterior of the air passage duct 28. By the foregoing multiple wall structure very good heat insulation of the air passage is accomplished for not only do the walls function as heat barriers but also the air space between walls 34 and 43, and 43 and 47, likewise serve as insulation.

About the above described heater elements there is provided a housing 49 formed of a light metal, as are the described heater elements, and including side walls 51 extending from the room wall to a front heater wall 52 across the front of the combustion chamber. A top member 53 and heater bottom 54 complete the housing and various portions thereof may be integrally formed together in accordance with the most convenient practices. Preferably stiffeners 56 are secured between the heat baffle 47 and housing front wall 52 as at the side walls near the bottom thereof and the heat baffle 47 is secured to the side walls to form a rigid housing structure. Room air passage through the heater housing and over the combustion chamber is facilitated and directed by upper and lower sets of louvers 57 and 58 respectively, formed in the front wall of the housing so that room air may enter the lower set of louvers 58 and after passing along the front wall 39 of the combustion chamber continue out the upper set of louvers 57 as directed by the slanted portion of the front chamber wall 39. The flow of room air through the heater is accomplished by convection air currents set up by heating air adjacent the combustion chamber from the combustion of the gas therein.

From the foregoing it will be seen that the present invention provides a high efficiency heater and regarding air flow through the system thereof, air enters directly from behind the flange 26 of the plate 23 and thence through the passage between cylinders 16 and 17 into the vertical air duct 28. The air is drawn down through the passage 29 of duct 28 by convection currents set up by the burner 38 and the air flows into the combustion chamber 33 to support combustion at the burner 38. The air duct baffle 30 deflects air downward below the burner so that the inrushing air will not blow out or deflect the burner flame or pilot. Additionally, this baffle prevents an excess of incoming air over that required for combustion and in the instance where there are provided side combustion chamber openings 59 this air duct baffle produces a correct mixture of primary and secondary air to the burner for combustion along the entire length thereof.

The combustion gases formed at the burner 38 are very hot and thus rise by convection to form the aforementioned current drawing air into the heater. These hot gases pass through the wide flat central passage 35 and deep narrow side passages 40 of the combustion chamber so as to intimately contact the chamber walls for maximum heat transfer thereto. Additionally, the gas rising in the central passage is mainly deflected laterally outward by the gas baffle 41 so as to swirl up over the ends thereof to produce a turbulent gas flow in the upper expanded portion of the combustion chamber whereby a maximum amount of heat is extracted therefrom. The combustion gas in the upper portion of the combustion chamber after turbulently flowing over the walls thereof exhausts through the vent pipe 17 and thence back to the external atmosphere between the plates 23 and 24 of the vent cap 21.

As clearly seen from the above described air flow and heat exchange notations, the present invention is highly efficient in that a maximum amount of heat is extracted from the combustion gases produced in the heater while yet retaining a simplicity of design and construction and a high degree of safety all in a single pipe unit providing easy and inexpensive installation.

What is claimed is:

1. A wall heater comprising a substantially vertical combustion chamber and air duct in alignment adapted for disposition within a room of a building, said combustion chamber having enlarged upper and lower portions and a burner in the latter and gas passages connecting same including a wide flat central passage and deep narrow side passages, a gas baffle extending substantially completely across the top of the central passage of said combustion chamber directing gas flow therethrough into said side passages, a single vent pipe adapted for disposition through a building wall in communication with the exterior atmosphere and having a first passage means connected to said air duct and a second passage means connected to the upper enlarged portion of said combustion chamber directly above said gas baffle and adjacent the center thereof, and means connecting said air duct to the lower enlarged portion of said combustion chamber and an air duct baffle directing air flowing therethrough beneath said burner and limiting the volume of such air to produce maximum combustion efficiency at said burner.

2. A wall heater comprising a single vent unit having air inlet and gas outlet passages therein, closely spaced opposing front and rear walls and side walls defining a vertical combustion chamber having a U-shaped cross-sectional form including a flat central portion and angularly related flat side portions and adapted to contain a burner adjacent the bottom thereof, said combustion chamber being attached to said gas outlet passage of said vent unit through the rear wall thereof adjacent and spaced from the chamber top for gas egress therefrom, means defining a vertical air duct immediately rearwardly of said combustion chamber and communicating between the bottom of same and the air inlet passages of said vent unit for providing air to said combustion chamber to support combustion therein and whereby air flows by convection through the aforementioned communicating elements during combustion at said burner, a heat shield extending about the side walls and rear wall of said combustion chamber at least above the burner location therein and spaced from such walls, a heat barrier wall between said heat shield and the means defining said air duct and spaced from said heat shield for limiting heat transfer to the air duct so that convection currents therethrough are not impeded, said front wall diverging outwardly from said rear wall adjacent the top thereof whereby said combustion chamber has an expanded section at the top thereof extending upwardly from and communicating with said vent unit, and a baffle disposed at the bottom of the expanded section and extending substantially completely across said chamber coterminous with the front wall thereof and positioned immediately below the gas outlet of said vent unit and substantially restricting gas flow to said side portions laterally spaced from said gas outlet for creating turbulence in said upper chamber section for maximum heat transfer to the walls thereof.

References Cited in the file of this patent

UNITED STATES PATENTS

| | | |
|---|---|---|
| 1,789,597 | Rasch | Jan. 20, 1931 |
| 1,790,777 | Torr | Feb. 3, 1931 |
| 1,926,104 | Leonard | Sept. 12, 1933 |
| 2,158,643 | Wacek | May 16, 1939 |
| 2,162,410 | Stephens | June 13, 1939 |
| 2,163,928 | Andrews | June 27, 1939 |
| 2,200,645 | Stephens | May 14, 1940 |
| 2,594,608 | Cartter | Apr. 29, 1952 |
| 2,632,435 | Lundstrum | Mar. 24, 1953 |
| 2,755,794 | Wendell | July 24, 1956 |